United States Patent
Mitchem et al.

(10) Patent No.: US 6,209,101 B1
(45) Date of Patent: Mar. 27, 2001

(54) ADAPTIVE SECURITY SYSTEM HAVING A HIERARCHY OF SECURITY SERVERS

(75) Inventors: Terrance Mitchem, Andover; Michael R. Carney, Minneapolis; Brian J. Loe, Apple Valley, all of MN (US)

(73) Assignee: Secure Computing Corporation, Roseville, MN (US)

( * ) Notice: Subject to any disclaimer, the term of this patent is extended or adjusted under 35 U.S.C. 154(b) by 0 days.

(21) Appl. No.: 09/118,537

(22) Filed: Jul. 17, 1998

(51) Int. Cl.[7] ............... G06F 11/30; H04L 9/32
(52) U.S. Cl. ............ 713/200; 713/201; 713/164; 713/151
(58) Field of Search ................. 713/200, 201, 713/164, 151

(56) References Cited

U.S. PATENT DOCUMENTS

| | | | |
|---|---|---|---|
| 5,758,077 | * | 5/1998 | Danahy et al. ............... 709/201 |
| 5,761,380 | * | 6/1998 | Lewis et al. ............... 706/47 |
| 5,764,887 | * | 6/1998 | Kells et al. ............... 713/200 |
| 5,784,612 | * | 7/1998 | Crane et al. ............... 713/100 |

\* cited by examiner

*Primary Examiner*—Tod R. Swann
*Assistant Examiner*—Ronald F. Sulpizio, Jr.
(74) *Attorney, Agent, or Firm*—Schwegman, Lundberg, Woessner & Kluth, P.A.

(57) ABSTRACT

An adaptive security system having a hierarchy of security servers. The security system maintains a primary security server for each task or process executing within a computing environment. An enforcement mechanism receives resource requests from the tasks and queries the corresponding primary security server which resolves the request based on a set of security associations. If the primary security server is unable to resolve the request, the enforcement mechanism queries a parent security server. Security servers are dynamically created and terminated in response to changing organizational policies. The present invention facilitates the dynamic creation and termination of security servers to adapt to organizational policy changes.

27 Claims, 4 Drawing Sheets

ADAPTIVE SECURITY SYSTEM HAVING A HIERARCHY OF SECURITY SERVERS

This invention was made with Government support under Contract F30602-96-C-0210 awarded by the Air Force. The Government has certain rights in this invention.

FIELD OF THE INVENTION

This invention relates generally to the field of secure computing environments, and more particularly to an adaptive security system having a hierarchy of security servers.

BACKGROUND

In order to control the management, protection and distribution of sensitive information, an organization defines a security policy and implements the policy through various laws, rules and practices. A security policy has several objectives. First, a security policy strives to maintain the confidentiality of the sensitive information by protecting the information from improper disclosure to unauthorized users. Second, a security policy seeks to maintain the integrity of the information by ensuring that users do not modify data to which they are not authorized and authorized users do not corrupt the information by improper operations. Finally, the policy seeks to minimize any burden on the availability and accessibility of the information to authorized users incurred as a result of the policy.

In a computing environment, an operating system controls access to resources such as files and network devices. Often a policy engine, also referred to as a security server, is used in conjunction with the operating system and calculates permissions to the resources based on the organization's security policy. Therefore, the policy engine must reflect the policies of the organization. This is often difficult because organizational policies change over time due to unforseen events such as organizational restructuring, formation of new alliances, and the onset of emergency situations. Implementing a policy engine in a computing environment is further complicated by the fact that organization policies often change during normal operations. For example, some organizations, such as banks, have different security policies for business hours than for evenings and weekends. Conventional policy engines are static and are unable to adapt to organizational policy changes. For the reasons stated above, and for other reasons stated below which will become apparent to those skilled in the art upon reading and understanding the present specification, there is a need in the art for an adaptive security system which can readily adjust to organizational policy changes. Furthermore, there is a need for a security system which can dynamically implement new security policies and terminate out-of-date policies.

SUMMARY OF THE INVENTION

As explained in detail below, the present invention is directed to an adaptive method and system for controlling access to resources in a computing environment. In one embodiment, the invention is a security system having a plurality of security servers. Each security server includes a set of security associations. An enforcement mechanism is communicatively coupled to the plurality of security servers and enforces a request to access one of the plurality of resources by querying one of the security servers. According to one feature of the invention, the enforcement mechanism includes an operating system kernel having a task control block for each of a plurality of tasks executing in the computing environment. The enforcement mechanism queries a primary security server that is identified in the task control block of the corresponding task.

According to another aspect of the invention, each primary security server is a task executing within the computing environment. The task control block of each primary security server identifies a parent security server for resolving resource requests that the primary security server is unable to resolve, thereby forming a hierarchy of security servers. Preferably, one of the security servers is a root security server. According to the present invention, security servers may be dynamically created and removed. To create a new security server, the kernel spawns the new security server as a task and links it to the hierarchy of existing security servers. More specifically, the kernel assigns the created security server a parent security server for handling resource requests that the created security sever is unable to resolve. The parent security sever is typically the default security server, i.e., the primary security server of the task that initiated the creation.

The kernel terminates a security server by identifying the tasks that have the terminated security server as a primary security server and setting the primary security server of each identified task to the parent security server of the terminated security server. According to another feature, the enforcement mechanism queries the security servers by generating an encrypted or digitally signed message and communicating the message to the queried security server.

In another embodiment, the invention is a method for controlling access to a plurality of resources in a computing environment. A user request to access one of the resources of the computing environment is received. Based on this request, at least one of a plurality of security servers is queried to resolve the resource request according to a set of security associations. The request is enforced as a function of a response from the queried security server.

In yet another embodiment, the present invention is a software program for processing user requests to access resources in a computing environment. The software program creates a hierarchy of security servers and assigns each user a primary security server. The software program enforces each user request by querying the corresponding primary security server to resolve the resource request based on a set of security associations.

As discussed in detail below, the present invention provides for the dynamic creation and termination of security servers in order to adapt to organizational policy changes. Each security server can be tailored to implement a unique security policy, thus allowing greater flexibility in defining security policies for different users and processes. These and other features and advantages of the invention will become apparent from the following description of the preferred embodiments of the invention.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the appended claims and their equivalents.

Figure 1:
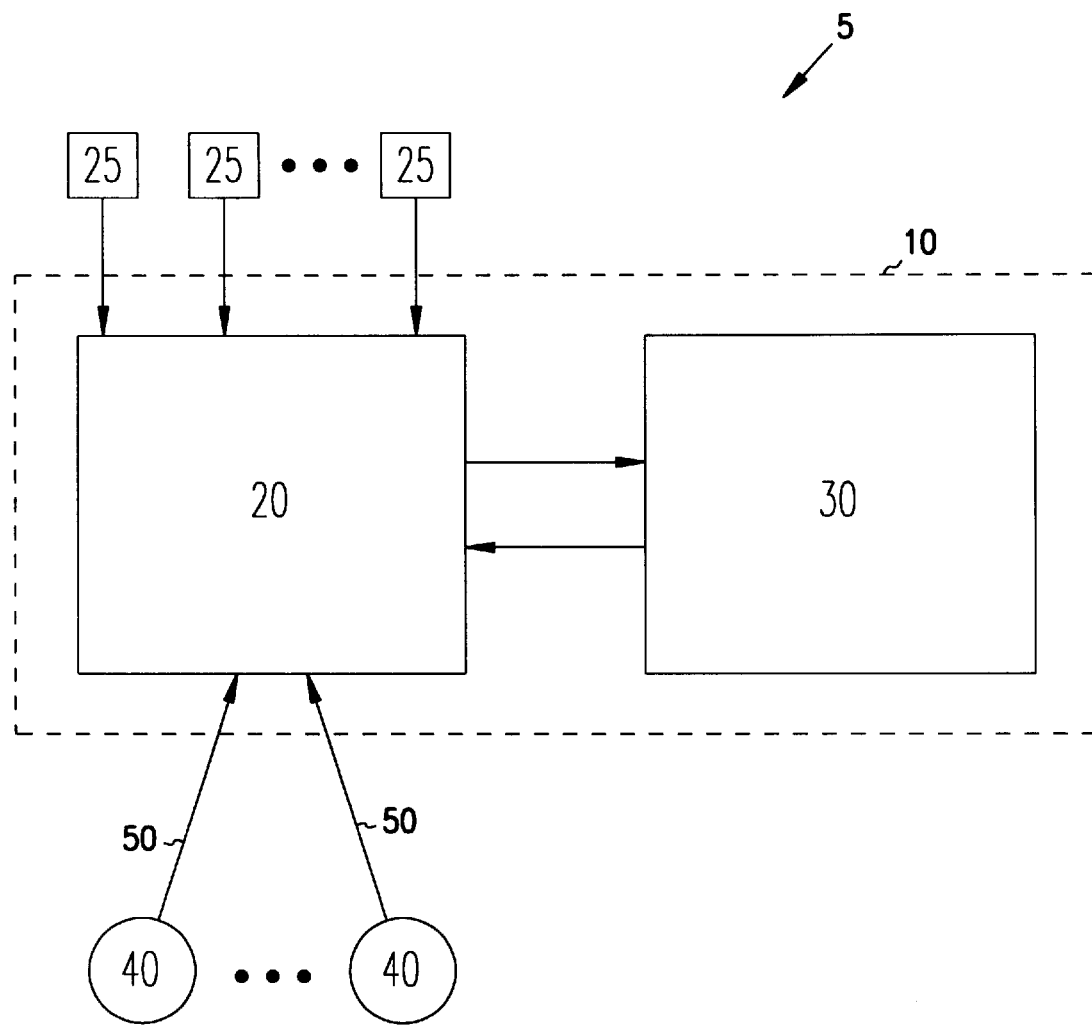
FIG. 1 is a block diagram of a security system having separate enforcement and policy resolution mechanisms.

FIG. 1 illustrates computing environment 5 in which security system 10 controls access to computing resources 25 according to a security policy. Computing resources 25 represent unique system resources such as network servers, stored data files and E-mail gateways while tasks 40 represent computational entities such as user applications, mail handlers and proxy servers. In one embodiment of computing environment 5, each task 40 encapsulates a single thread of execution. In another embodiment, each task 40 represents a process having one or more related threads that share the same address space.

Security system 10 is shown in block diagram form and includes enforcement mechanism 20 and policy resolution mechanism 30. Each task 40 issues a resource request 50 to enforcement mechanism 20 when desiring to operate on one of the computing resources 25. For example, tasks 40 may issue resource requests in order to mount a network drive, retrieve information from a tape drive or delete a particular file. Upon receiving resource request 50, enforcement mechanism 20 queries policy resolution mechanism 30 to resolve the resource request. The policy query identifies the requesting task 40, the requested resource 25 and the desired operation to be performed on the requested resource 25. In one embodiment, enforcement mechanism 20 queries policy resolution mechanism 30 by generating an encrypted message and communicating the encrypted message to policy resolution mechanism 30. In yet another embodiment, enforcement mechanism 20 digitally signs the communicated message.

Policy resolution mechanism 30 receives the policy query from enforcement mechanism 20 and determines whether requesting task 40 is permitted to perform the desired operation on requested resource 25. Policy resolution mechanism 30 resolves the policy query based on a set of security associations that define access rights for each task 40. In one embodiment, policy resolution mechanism 30 maintains the set of security associations as an access matrix having tasks 40 and resources 25 as indices. In this embodiment, each entry of the access matrix defines a set of operations that a corresponding task 40 is permitted to invoke on a particular resource 25. In another embodiment, policy resolution mechanism 30 accesses a security database of stored security associations. Based on the security associations, policy resolution mechanism 30 issues a response indicating whether the resource request is granted or denied. Enforcement mechanism 20 enforces the resource request based on the response from policy resolution mechanism 30.

Figure 2:
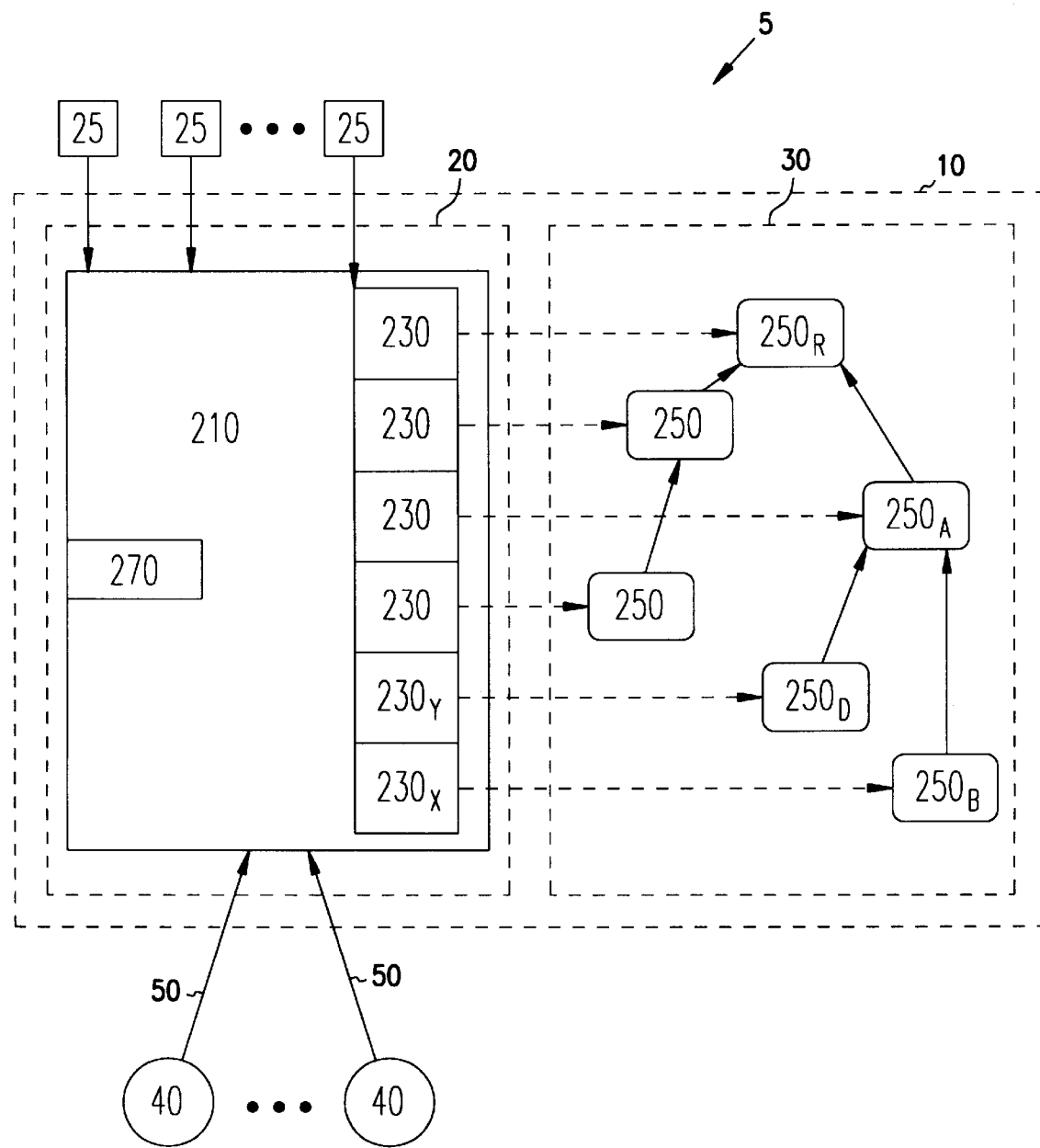
FIG. 2 illustrates one embodiment of security system in which the policy resolution mechanism has a hierarchy of security servers in accordance with the present invention.

FIG. 2 illustrates one embodiment of security system 10 in which enforcement mechanism 20 is an operating system kernel 210 and policy resolution mechanism 30 has a plurality of security servers 250. Kernel 210 maintains a task control block (TCB) 230 for each task 40. A TCB is a data structure containing all relevant information necessary to manage the execution of the corresponding task 40. For example, each TCB 230 contains a task state, such as idle or running, and a copy of hardware registers, including a program counter, that are loaded when a task switch occurs and the corresponding task 40 is executed. In addition, each TCB 230 identifies one security server 250 as a primary security server for the TCB's corresponding task 40 as indicated by the dashed interconnecting arrows of FIG. 2. As each task 40 requests access to one of the resources 25, kernel 210 examines the TCB 230 corresponding to the requesting task 40 in order to identify the primary security server 250 for the requesting task 40. Upon identifying the primary security server 250, kernel 210 queries the identified primary security server 250 to determine whether the requesting task 40 is authorized to perform the operation on the desired resource 25.

In this fashion, policy resolution mechanism 30 implements an organization's security policy using a plurality of security servers 250. One advantage of this technique is that each security server 250 can be tailored to implement a security policy unique to the corresponding task 40. In this way, users and applications can easily be uniquely controlled. Furthermore, because each security sever 250 can implement highly-specialized policies, policy resolution mechanism 30 is more flexible than conventional policy engines. Each security server 250 can be implemented in an efficient, light-weight manner that is relatively easy to develop and administer.

In one embodiment of security system 10, each security server 250 is implemented as a task that is executed and managed by kernel 210 similar to the execution and management of tasks 40. In this embodiment, kernel 210 is essentially unaware of each security server 250, thereby further decoupling policy resolution mechanism 30 from enforcement mechanism 20. In this embodiment, each security server 250 has a corresponding TCB, as do other tasks 40 that are executed by kernel 210. The TCB for each security server 250, however, does not identify a primary security server 250 as does the TCB for tasks 40. Instead, the TCB for each security server 250 identifies a parent security server 250 as indicated by the solid arrows interconnecting security servers 250 of FIG. 2.

When a task's 40 primary security server 250 is unable to resolve a policy query, kernel 210 in turn queries the parent security server as indicated by the primary security server's TCB. If the parent security server is unable to resolve the resource request, kernel 210 continues up the hierarchy of security servers 250 until reaching root security server $250_R$. If security server $25_R$ is unable to resolve the resource request, it denies access to the requested resource 25.

One way in which security system 10 adapts to changes in security policies is by facilitating the dynamic creation and termination of security servers 250. By allowing the creation of new security servers, security system 10 allows new policies to be enforced. Similarly, by allowing existing security servers to be removed, security system 10 enforces previously established organizational policies. For example, security system 10 allows an organization, such as a bank, to enforce different security policies for nights and weekends simply by creating new security servers at the conclusion of business hours. Similarly, security system 10 simply terminates the new security servers in order to revert back to enforcing the organization's security policies for business hours.

Dynamic Creation of Security Servers

Each task 40 is said to execute in a "security domain" which refers to its right to access and manipulate resources 25. In one embodiment, each security server 250 executes in a common security domain. In order to create a new security server 250, the creating task 40 spawns a new thread of execution and commands kernel 210 to "execute" the spawned thread in the security domain common to the other security servers 250. If the creating task 40 in not authorized to spawn a thread for execution within the common security domain, the kernel 210 rejects the command. If the creating task 40 is authorized to create a security server 250, kernel 210 creates a corresponding TCB for the new security server 250 and initializes the newly created TCB in order to define a parent security server for the new security server. In one embodiment, kernel 210 sets the parent security server of the newly created security server to the primary security server of the creating task 40. For example, if the creating task is a security server 250, then kernel 210 sets the parent security server of the created task to point to the creating task. Upon initializing the TCB, kernel 210 starts execution of the created security server 250.

Figure 3:
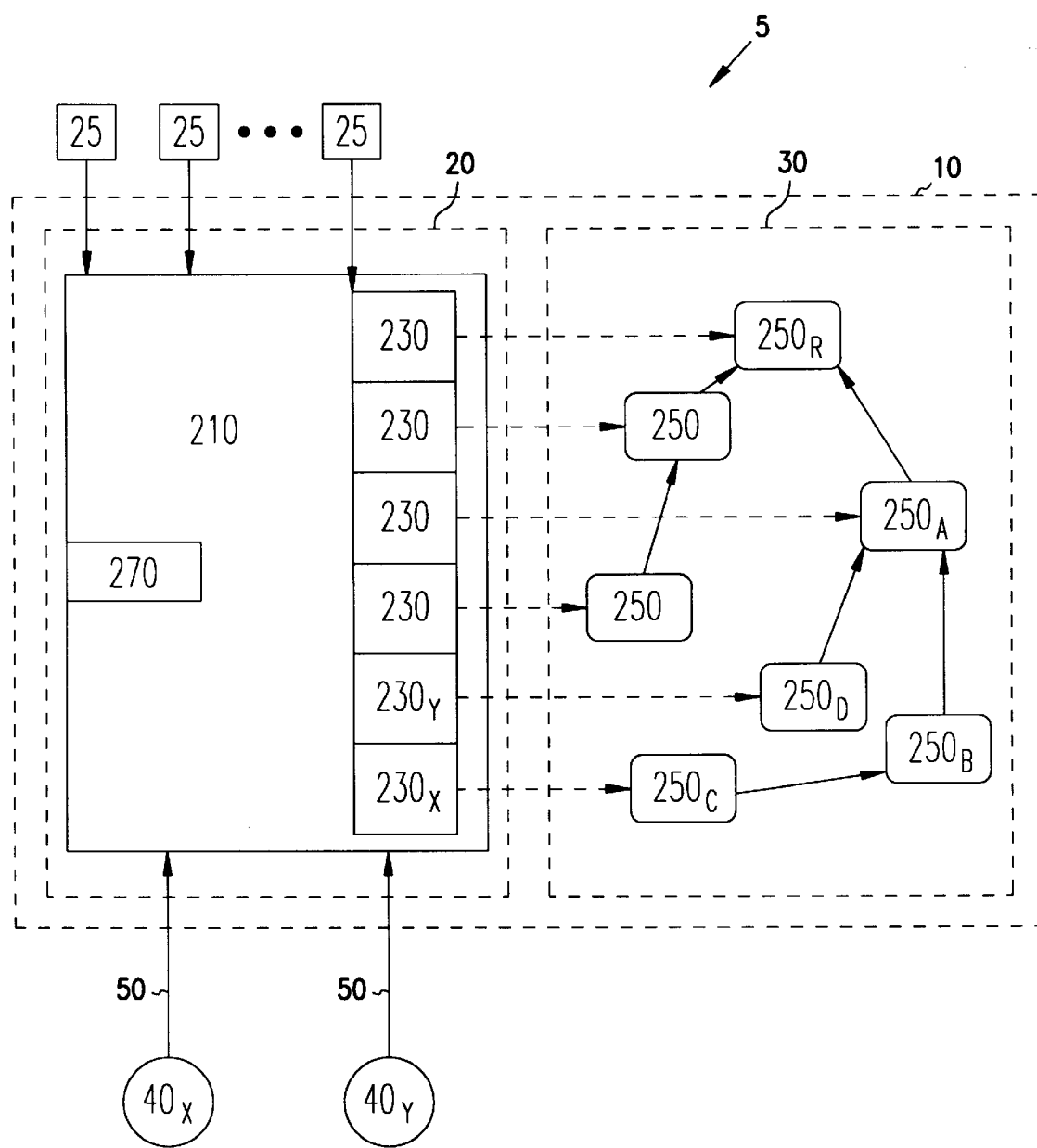
FIG. 3 illustrates the security system of FIG. 2 after a new security server has been created and linked to the hierarchy of security servers in order to adapt to changing organizational policies.

FIG. 3 illustrates security system 10 where a security server $250_C$ is created in order to enforce new organizational policies. In order to create security server $250_C$, task $40_x$ requests kernel 210 to spawn a new task for execution in the security domain common to security servers 250. If task $40_x$ is authorized to spawn such a thread, kernel 210 spawns security server $250_C$. In one embodiment, task $40_x$ is limited to spawning threads from a predetermined set of executables. In this manner, task $40_x$ can only spawn security servers having approved security policies.

After spawning security server $250_C$, kernel 210 changes TCB $230_x$ of task $40_x$ to reference security server $250_C$ as its primary security server instead of security server $250_B$. In this manner, the security domain of task $40_x$ is modified to reflect the new organizational policies as reflected by the security associations stored within newly created security server $250_C$. As such, security system 10 either grants new permission to task $40_x$ or removes permissions that were previously available under security server $250_B$. Other tasks that are subsequently spawned by task $40_x$ will be initialized to have newly created security server $250_C$ as a primary security server.

Dynamic Termination of Security Servers

Figure 4:
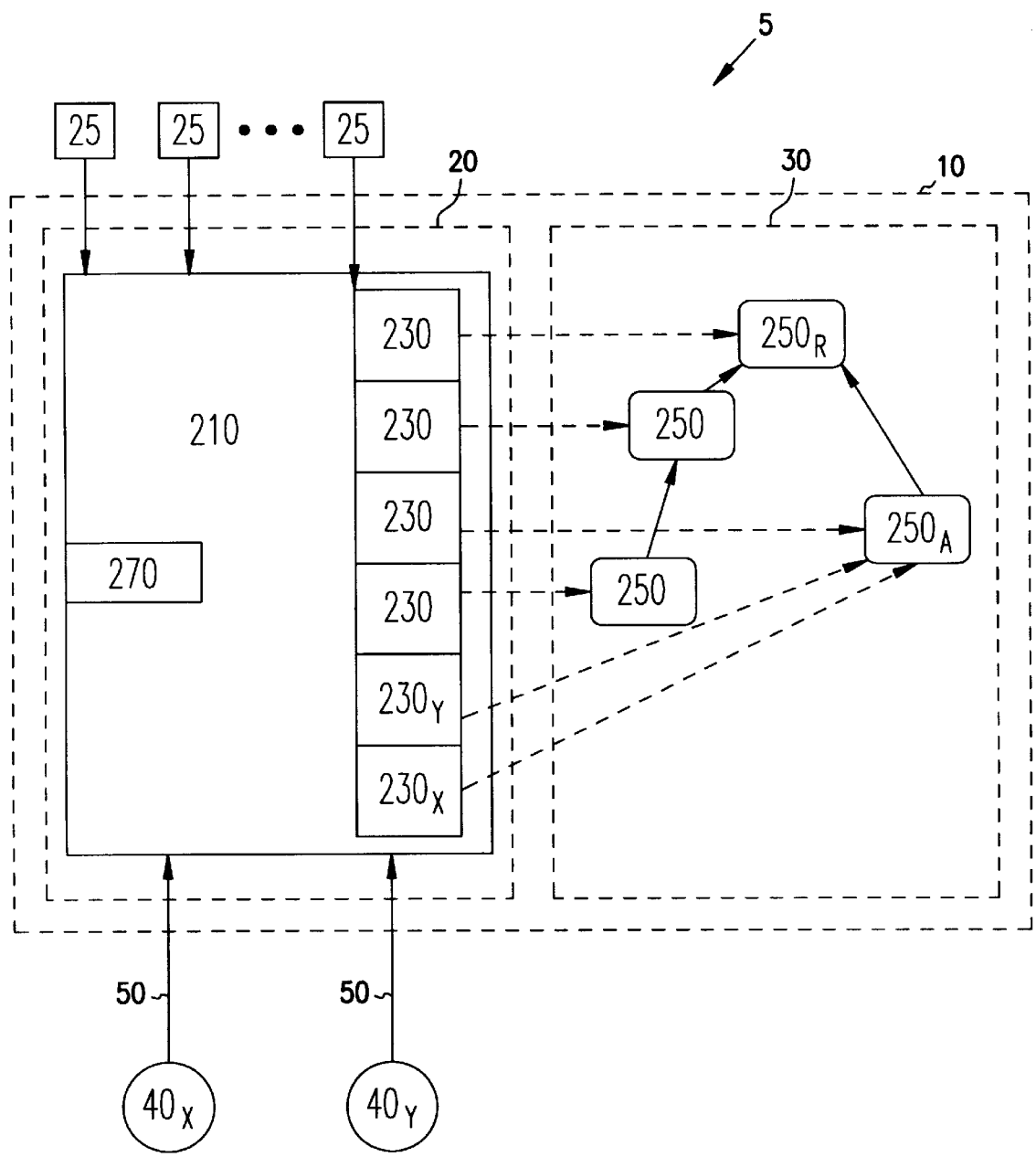
FIG. 4 illustrates the security system of FIG. 3 after two of the security servers are terminated to adapt to changing organizational policies.

FIG. 4 illustrates security system 10 after the termination of security servers $250_B$ and $250_C$ of FIG. 3. A security server may be terminated in several ways. For example, security server $250_C$ may be terminated by authorized task $40_x$. To terminate security server $250_C$, task $40_x$ issues a proper command to kernel 210, such as a task delete command. Alternatively, security server $250_C$ may terminate itself upon completing its thread of execution. In one embodiment, each security server 250 maintains an execution period that defines a time period of execution. When the execution period expires, the corresponding security server 250 terminates itself. This approach allows security system 10 to transition back from temporary policies to older, more established policies such as transitioning from weekend policies to policies for weekdays.

When a security server 250 is terminated, kernel 210 ensures that all tasks 40 have an executing primary security server 250. More specifically, kernel 210 examines each TCB 230 and identifies all tasks which have the terminated security server as a primary security server. Kernel 210 modifies the TCB 230 of the identified tasks by setting each task's primary security server to the parent security server of the terminated security server. For example, as illustrated in FIG. 3, security server $250_C$ is the primary security server for task $40_x$ as indicated by TCB $230_X$. Thus, when kernel 210 terminates security server $250_C$, it modifies TCB $230_X$ to reference security server $250_B$ as a primary security server because security server $250_B$ is the parent security server of terminated security server $250_C$. Similarly, when kernel 210 terminates security server $250_B$, it modifies TCB $230_X$ to reference security server $250_A$ as a primary security server because security server $250_A$ is the parent security server of terminated security server $250_B$. Finally, when kernel 210 terminates security server $250_D$, it modifies TCB $230_Y$ to reference security server $250_A$ as a primary security server. In the event that an intermediate security server is terminated, the hierarchy of security servers is similarly maintained. FIG. 4 illustrates the resultant hierarchy of security servers 250 after security servers $250_C$ and $250_B$ (FIG. 3) are terminated as described above.

In one embodiment, kernel 210 includes cache 270 which contains security associations that have been previously resolved by one of the security servers 250 in response to previous policy queries. This allows kernel 210 to handle repetitive resource requests 50 without requiring that the kernel 210 send requests for policy resolution to the security servers 250. Security system 10 ensures that the cached security associations of a terminated security server 250 are never incorrectly relied upon. More specifically, security system 10 removes any dependence on the terminated security server 250 by modifying the TCB 230 for all tasks 40 that have the terminated security server 250 as a primary security server. In this fashion, the invalid cache entries need not be flushed immediately. In one embodiment, cache 270 includes all security associations of root security server $250_R$. In this embodiment, when security system 10 is initialized, or when the organization's root policies change, newly created security server $250_R$ flushes cache 270 and reloads cache 270 with the new security associations. Preferably, the cache flush operation and the reloading of the root security associations is performed atomically to prevent the possibility of a cache miss.

In addition to cache 270, certain tasks 40, such as file servers or network servers, may maintain a local cache of resolved security associations in order to minimize requests 50 to kernel 210. In order to adapt to changing security policies, security system 10 requires that these tasks 40 register with their corresponding primary security server 250. Each security server 250 maintains a list of registered tasks 40 and informs each registered task 40 to flush its local cache in the event of an impending termination of its primary security server 250.

In one embodiment, security system 10 is distributed throughout a computing environment having a plurality of network computing machines. In this embodiment, each machine has an enforcement mechanism 20 but the hierarchy of security servers 250 are distributed across the machines. In order to minimize the burden on network communication, cache flushes for each enforcement mechanism 20 on each machine are limited to the security servers 250 actually executing on the corresponding machine.

Various embodiments of an adaptive security system having a separate enforcement mechanism and a policy resolution mechanism have been described. In one embodiment the enforcement mechanism is an operating system kernel while the policy resolution mechanism has a hierarchy of security servers. The enforcement mechanism maintains a data structure, such as a task control block (TCB), which references a primary security server for each task executing within the computing environment. In another embodiment, the enforcement mechanism maintains a single data structure for each process having one or more related threads of execution that share the same address space. Each security server maintains a set of security associations for resolving policy queries from the enforcement mechanism. In one embodiment, each security server maintains the security associations as an access matrix defining a set of operations that each task is permitted to invoke on each computing resource. In another embodiment, a policy resolution mechanism accesses a security database of stored security associations. As described above, the adaptive security system of the present invention may be implemented on a single machine within the computing environment or may be distributed such that the hierarchy of security servers are distributed across a plurality of network computing machines.

Several advantages of the present invention have been illustrated, including the dynamic creation and termination of security servers in order to adapt to organizational policy changes. Each security server can be tailored to implement unique security policies, thus allowing greater flexibility in controlling users and processes. Because each security server can incorporate highly-specialized policies, each security server can be implemented in an efficient, light-weight manner that is relatively easy to develop and administer. No single security server need be aware of the organization's entire security policy. This application is intended to cover any adaptations or variations of the present invention. It is manifestly intended that this invention be limited only by the claims and equivalents thereof.

We claim:

1. A security system for controlling access to a plurality of resources within a computing environment comprising:

a plurality of security servers, wherein each security server includes a set of security associations; and an enforcement mechanism communicatively coupled to the plurality of security servers, wherein the enforcement mechanism enforces a request to access one of the plurality of resources by querying one of the security servers.

2. The security system of claim 1, wherein the enforcement mechanism includes an operating system kernel having a task control block for each of a plurality of tasks executing in the computing environment, and further wherein the enforcement mechanism queries a primary security server identified in the task control block of the corresponding task.

3. The security system of claim 2, wherein each primary security server is a task executing within the computing environment, and further wherein the task control block of each primary security server identifies a parent security server for resolving resource requests that the primary security server is unable to resolve.

4. The security system of claim 3, wherein one of the security servers is a root security server.

5. The security system of claim 3, wherein each security server includes a data structure defining an execution period.

6. A security system for controlling access to a plurality of resources within a computing environment comprising:

a plurality of security servers, wherein each security server includes a set of security associations; and an enforcement mechanism communicatively coupled to the plurality of security servers, wherein the enforcement mechanism enforces a request to access one of the plurality of resources by querying one of the security servers, wherein the enforcement mechanism includes an operating system kernel having a task control block for each of a plurality of tasks executing in the computing environment, wherein the enforcement mechanism queries a primary security server identified in the task control block of the corresponding task, wherein each primary security server is a task executing within the computing environment, wherein the task control block of each primary security server identifies a parent security server for resolving resource requests that the primary security server is unable to resolve, wherein each security server includes a data structure defining an execution period, wherein the kernel creates a security server based on a command from one of the tasks in the computing environment, and further wherein the kernel sets the parent security server of the created security server to the primary security server of the commanding task.

7. A security system for controlling access to a plurality of resources within a computing environment comprising:

a plurality of security servers, wherein each security server includes a set of security associations; and an enforcement mechanism communicatively coupled to the plurality of security servers, wherein the enforcement mechanism enforces a request to access one of the plurality of resources by querying one of the security servers, wherein the enforcement mechanism includes an operating system kernel having a task control block for each of a plurality of tasks executing in the computing environment, wherein the enforcement mechanism queries a primary security server identified in the task control block of the corresponding task, wherein each primary security server is a task executing within the computing environment, wherein the task control block of each primary security server identifies a parent security server for resolving resource requests that the primary security server is unable to resolve, wherein each security server includes a data structure defining an execution period, wherein the kernel terminates a security server by identifying the tasks that have the terminated security server as a primary security server, and further wherein the kernel sets the primary security server of each identified task to the parent security server of the terminated security server.

8. The security system of claim 1, wherein the security servers are distributed across a plurality of computers.

9. A security system for controlling access to a plurality of resources within a computing environment comprising:

a plurality of security severs, wherein each security server includes a set of security associations; and an enforcement mechanism communicatively coupled to the plurality of security servers, wherein the enforcement mechanism enforces a request to access one of the plurality of resources by querying one of the security servers, wherein the enforcement mechanism includes an operating system kernel having a task control block for each of a plurality of tasks executing in the computing environment, wherein the enforcement mechanism queries a primary security server identified in the task control block of the corresponding task, and wherein the operating system kernel includes a cache containing policy queries previously resolved by the security servers.

10. The security system of claim 9, wherein each security server contains a list of registered tasks to be notified when the corresponding security server is terminated.

11. A security system for controlling access to a plurality of resources within a computing environment comprising:

a plurality of security severs, wherein each security server includes a set of security associations; and an enforcement mechanism communicatively coupled to the plurality of security servers, wherein the enforcement mechanism enforces a request to access one of the plurality of resources by querying one of the security servers, wherein the enforcement mechanism includes an operating system kernel having a task control block for each of a plurality of tasks executing in the computing environment, wherein the enforcement mechanism queries a primary security server identified in the task control block of the corresponding task, and wherein each security association maps the requesting task and the requested resources to a response that is selected from the set of (I) access granted, (ii) access denied and (iii) security fault.

12. The security system of claim 1, wherein the enforcement mechanism queries the security servers by generating an encrypted message and communicating the encrypted message to the queried security server.

13. The security system of claim 1, wherein the enforcement mechanism queries the security servers by generating a digitally signed message and communicating the digitally signed message to the queried security server.

14. A method for controlling access to a plurality of resources in a computing environment comprising the steps of:

receiving a user request to access one of the resources of the computing environment;

querying at least one of a plurality of security servers to resolve the resource request based on a set of security associations; and enforcing the request as a function of a response from the queried security server.

15. The method of claim 14, wherein the computing environment includes an operating system kernel having a task control block for each of a plurality of tasks executing in the computing environment, and further wherein the querying step includes the steps of:

examining the task control block to determine a primary security server for a task requesting one of the resources; and querying the primary security server to resolve the resource request.

16. The method of claim 15, wherein each security server is a task executing within the computing environment, and wherein the querying step further performs the following steps when the primary security server is unable to resolve the resource request:

identifying a parent security server identified in the task control block of the primary security server; and querying the parent security server to resolve the resource request.

17. A method for controlling access to a plurality of resources in a computing environment that includes an operating system kernel having a task control block for each of a plurality of tasks executing in the computing environment, comprising the steps of:

receiving a user request to access one of the resources of the computing environment;

querying at least one of a plurality of security servers to resolve the resource request based on a set of security associations, wherein each security server is a task executing within the computing environment, wherein the querying step includes the steps of:

examining the task control block to determine a primary security server for a task requesting one of the resources;

querying the primary security server to resolve the resource request; and when the primary security server is unable to resolve the resource request, identifying a parent security server identified in the task control block of the primary security server; and querying the parent security server to resolve the resource request;

enforcing the request as a function of a response from the queried security server;

creating a security server upon receiving a first command from one of the tasks; and terminating a security server upon receiving a second command from one of the tasks.

18. The method of claim 17, wherein the creating step includes the step of setting the parent security server of the created security server to the primary security server of the commanding task.

19. The method of claim 17, wherein the terminating step includes the steps of:

examining each task control structure of the operating system kernel to identify a set of tasks having the terminated security server as the primary security server; and changing the primary security server for each identified task to the parent security server of the terminated security server.

20. The method of claim 17, wherein the operating system kernel includes a cache containing security associations for previously resolved policy queries.

21. The method of claim 20, wherein each security server maintains a list of registered tasks, and further wherein the terminating step includes the step of notifying each of the identified tasks that the terminated security server has been terminated.

22. The method of claim 14, wherein the querying step includes the step of querying one or more security servers distributed across a plurality of computers.

23. A method for controlling access to a plurality of resources in a computing environment comprising the steps of:

receiving a user request to access one of the resources of the computing environment;

querying at least one of a plurality of security servers to resolve the resource request based on a set of security associations, wherein the querying step includes the step of selecting the response from the set of: (I) access granted, (ii) access denied and (iii) security fault; and enforcing the request as a function of a response from the queried security server.

24. The method of claim 14, wherein the querying step includes the step of generating an encrypted message and communicating the encrypted message to the queried security server.

25. The method of claim 14, wherein the querying step includes the step of generating a digitally signed message and communicating the digitally signed message to the queried security server.

26. A computer-readable medium encoded with a software program for processing user requests for resources in a computing environment, the software program executing the steps of:

creating a hierarchy of security servers, wherein each user is assigned a primary security server; and enforcing each of a plurality of user requests by querying the corresponding primary security server to resolve the resource request based on a set of security associations.

27. The computer-readable medium encoded with a software program of claim 26, wherein the querying step includes the step of querying a parent security server of the primary security server when the primary security server is unable to resolve the resource request.

* * * * *